United States Patent
Baranova

[19]
[11] Patent Number: 6,041,546
[45] Date of Patent: Mar. 28, 2000

[54] PLANTER POUCH

[75] Inventor: Irena Baranova, St. Petersburg, Fla.

[73] Assignee: NoDirt Exotic Planters, Inc., St. Petersburg, Fla.

[21] Appl. No.: 09/084,327

[22] Filed: May 26, 1998

[51] Int. Cl.[7] .................................................. A01G 9/02
[52] U.S. Cl. ............................................. 47/65.8; 47/64
[58] Field of Search .................................. 47/65.8, 65.5, 47/64, 63, 41.11, 41.12

[56] References Cited

U.S. PATENT DOCUMENTS

| | | |
|---|---|---|
| 1,624,407 | 4/1927 | Hamilton .............................. 47/41.12 |
| 1,828,295 | 10/1931 | Roy . |
| 1,994,962 | 3/1935 | Rushfeldt ............................... 47/65.8 |
| 2,881,939 | 4/1959 | Nelson . |
| 2,971,292 | 2/1961 | Malecki . |
| 3,177,617 | 4/1965 | Koistinen ............................. 47/41.12 |
| 3,336,129 | 8/1967 | Herrett et al. . |
| 3,524,279 | 8/1970 | Adams . |
| 3,736,889 | 6/1973 | Reid . |
| 3,831,317 | 8/1974 | Porte . |
| 3,973,353 | 8/1976 | Dedolph . |
| 4,034,508 | 7/1977 | Dedolph . |
| 4,035,951 | 7/1977 | Dedolph . |
| 4,164,413 | 8/1979 | Jinno et al. . |
| 4,241,537 | 12/1980 | Wood . |
| 4,320,040 | 3/1982 | Fujita et al. . |
| 4,418,496 | 12/1983 | Koistinen ............................. 47/41.12 |
| 4,559,074 | 12/1985 | Clarke . |
| 4,579,578 | 4/1986 | Cooke . |
| 4,690,971 | 9/1987 | Flesher et al. . |
| 4,790,105 | 12/1988 | Wareing et al. . |
| 4,906,276 | 3/1990 | Hughes . |
| 4,972,627 | 11/1990 | Hori et al. . |
| 4,985,061 | 1/1991 | Hughes . |
| 4,985,062 | 1/1991 | Hughes . |
| 5,115,915 | 5/1992 | Harris . |
| 5,142,820 | 9/1992 | Aquino ............................... 47/41.12 |
| 5,185,024 | 2/1993 | Siemer et al. . |
| 5,209,768 | 5/1993 | Hughes . |
| 5,405,905 | 4/1995 | Darr . |
| 5,469,654 | 11/1995 | Thompson . |
| 5,515,644 | 5/1996 | Weder et al. . |
| 5,706,604 | 1/1998 | Yogi ..................................... 47/65.8 |
| 5,761,847 | 6/1998 | Ito et al. .............................. 47/65.8 |
| 5,927,006 | 7/1999 | Elliott .................................. 47/59 |

*Primary Examiner*—Michael J. Carone
*Assistant Examiner*—Joanne C. Downs
*Attorney, Agent, or Firm*—Stephen E. Feldman

[57] ABSTRACT

There is disclosed a planter pouch comprising a bag shaped, flexible, plastic bladder having an open top and containing a polymeric growth medium. The open top is secured between a rigid collar and a cylindrical cap, the cap being provided with a plurality of slits through which the stalks of living plants can be inserted until their roots are embedded in the polymeric growth medium. The planter pouch permits living plants contained therein to grow without adding water for prolonged periods of time.

10 Claims, 1 Drawing Sheet

PLANTER POUCH

FIELD OF THE INVENTION

This invention relates to a planter pouch. More particularly, this invention relates to a planter pouch which incorporates the use of 100% synthetic polymer growth media and is used as a vessel in which to cultivate and grow house plants, flowers, shrubs, and the like, or as an initial seedling container for the cultivation of nursery shrubs, plants, flowers, and the like. The planter pouch of the invention solves the inherent problem of water evaporation from the synthetic polymer growth media thereby eliminating the need for watering for prolonged periods of time.

BACKGROUND OF THE INVENTION

The use of water absorbent, wholly synthetic polymers to cultivate shrubs, plants, flowers, and the like is well known. Their uses are known to include their incorporation in growth media such as soil as well as including them in various kinds of containers, vessels and structures so as to increase the ware absorption of the growing medium for cultivation. For example, U.S. Pat. No. 1,828,295 to Roy discloses a flower holder with a sealing element of plastic material. U.S. Pat. No. 3,524,279 to Adams discloses a tray having polymer-containing blocks in which plants can be inserted for growth. The blocks can be over wrapped with a plastic sheet to retard water evaporation. However, the blocks are brittle and tend to break it jostled or dropped making them difficult to handle or transport. U.S. Pat. No. 3,973,355 to McKenzie discloses a hydrophilic plant growth foam matrix that uses a cross linking polymer as a bonding agent to convert plant growth particles into a self-containing, dimensionally stable growth matrix. U.S. Pat. No. 4,034,508 to DeDolph discloses a polymerized soil plug having a growing plant molded in it using a body of spongy, open-celled, hydrophilic polymer mixed with particles of soil in combination with a synthetic resin to bind the roots in the plug. U.S. Pat. No. 4,241,537 to Wood discloses a polyurethane gel plant growth media in a plastic tube container. U.S. Pat. No. 4,790,105 discloses seedling plants contained in a sealed, sterile dish having an agar gel which may include a growing tray of compost and which can be provided with a cover to form a propagator for transplanting the seedlings from the dish. U.S. Pat. No. 4,985,062 to Hughes discloses a method of utilizing aqueous gels to improve crop yield even in the absence of plant nutrients. U.S. Pat. No. 5,209,768 to Hughes discloses the use of an aqueous gel, including a highly absorbent, cross-linked, acrylic acid, to improve the yield of germinating sod crops and a method for promoting root formation and vegetative growth. U.S. Pat. No. 5,405,905 to Darr discloses an artificial soil plant composition consisting of a polymeric gel formed from a polyacrylamide copolymer, water and a pigment. U.S. Pat. No. 5,515,644 to Weder, et.al. discloses a floral container having a water impermeable external layer and an artificial soil to hold the floral material.

While these prior art containers and growth media provide useful plant growth environments, they do not address nor solve the inherent problem of water evaporation from the super absorbent polymers or aqueous gels employed. Under normal atmospheric conditions, water or moisture will evaporate from such polymers end gels in about a week or ten days unless virtually air-tight containers or vessels are employed. In addition, as evaporation occurs, the gels become reduced in size and the polymers become hardened and crusty creating a virtually impenetrable barrier for the roots of the living plants to take hold and imposing extreme stress on the living plants.

SUMMERY OF THE INVENTION

It has now been found that these short comings in closed and partially closed prior art plant containers and growth media are overcome by utilizing the planter pouch of the invention. In general, the planter pouch of the invention comprises: a flexible, plastic bladder having an open top; a rigid, circular collar over which the open top of said bladder is draped; a cylindrical cap having a top and an open bottom, said open bottom being secured to said collar with the open top of said bladder held therebetween; a polymeric growth medium in said bladder in an amount sufficient to receive the roots of a living plant therein; and, means to insert the stalk of a living plant into said growth polymer medium through the top of said cylindrical cap.

The plastic bladder is of a generally bag shaped configuration, has high water (or moisture) and air barrier properties, and is chemically inert with respect to the polymer growth medium employed. Illustrative of the plastic materials that can be used for this purpose are low density polyethylenes such as "Film-Gard Plastic Sheeting" produced by Carlisle Plastics, Inc., Minneapolis, Minn.

The rigid, circular collar can also be provided from suitable, light weight plastics such as PETG copolyester; i.e., polyeth terephthalate glycol copolyester. In addition to being light weight and rigid, these types of plastics are of sufficient strength not only to support the bladder containing the polymeric growth medium as well as the collar, but to also withstand multiple handling of the planter.

The cylindrical cap can be provided from suitable stretchable vinyls such as stretchable polyvinyl chlorides (PVCs). These types of vinyl materials exhibit sufficient strength and flexibility to enable the stalk of a living plant with its root structure to be inserted through them and embedded into the polymeric growth medium while, at the same time, adhering to the implanted stalk to create a virtually air tight seal. To provide access for a living plant stalk and roots through the cap, a plurality of slits are formed in the top of the cap. These slits also permit new plant growth to penetrate upward through the slits similar to new plant growth penetrating normal soil or other growing medium while maintaining an air tight seal to minimize or virtually eliminate moisture evaporation.

The polymeric growth medium employed in the planter of the invention should be one that is thin and that forms a readily permeable and penetrable polymeric membrane. These types of polymers are typically hydrated ("grown") in a solution consisting of only water for a period of not less than about 24 hours to about 48 hours. The thus "grown" polymer is then dried and aerated to remove all visual signs of water from its outer surface. If visual water is not removed, excess water not absorbed by the polymer would remain in liquid form in the bladder and result in "drowning" a live plant stalk. Contrary to prior teachings, the growth of a polymer within a closed vessel does not result in maximum retention and absorption of water, but results in the polymeric membrane surface becoming stiff or crusty making it difficult for the roots of live plants to penetrate.

These polymers are hydrophilic polymers; i.e., water absorbing polymers, and are typically cross-linked acrylamide potassium acrylate copolymers or cross-linked polyacrylamides. Suitable polymers that can be used for the polymeric growth medium in the planter of the invention are those such as SORBEX available from the EXACTO Chemical Company, Terra-Sorb available from Plant Health Care Inc., Hydro-Gel Polymers available from Sumitomo Chemical Company, A.C. Polymer available from the American Colloid Company, and Polyox available from Union Carbide Chemical Corp.

SORBEX 9001G, available from the EXACTO Chemical Company, is a preferred polymer for use in the planter of the invention. This polymer is an organic, cross-linked acrylamide/acrylic acid copolymer based on potassium salt with water binding groups. The groups dissociate into negatively charged carboxyl ions which contain large numbers of ionic groups that repel each other. The polymer chain results in more bulk which extends its propensity to absorb increased volumes of aqueous fluid. The slight cross-linkage of the 9000 series of absorbents produces a gel which retains fluid under stress.

Another preferred polymer that can be used for the growth medium of the invention is a cross-linked acrylamide potassium acrylate copolymer available under the trade name STOCKOSORB 410K from Stockhauser, Inc., Greensboro, N.C.

Non-hydrophilic crystals of the same polymer used for the growth medium can also be added to the planter to compensate for unwanted or increased moisture resulting from, for example, condensation. The non-hydrophilic; i.e., water or moisture free, crystals act to absorb the unwanted or increased moisture and can be added to the planter in an amount of from about 1% to about 2% based upon the amount of hydrophilic polymer growth medium used.

The bladder of the planter pouch of the invention is filled with a suitable polymer in such a manner that the structural mass of each polymeric cluster is maintained thereby providing for a larger mass to be penetrated by the roots of the living plant while further reducing the effect of evaporation.

BRIEF DESCRIPTION OF THE DRAWING

The planter pouch of the invention will become more apparent from the ensuing discussion when considered together with the accompanying drawing wherein.

DETAILED DESCRIPTION OF THE DRAWING AND THE INVENTION

Figure 1:
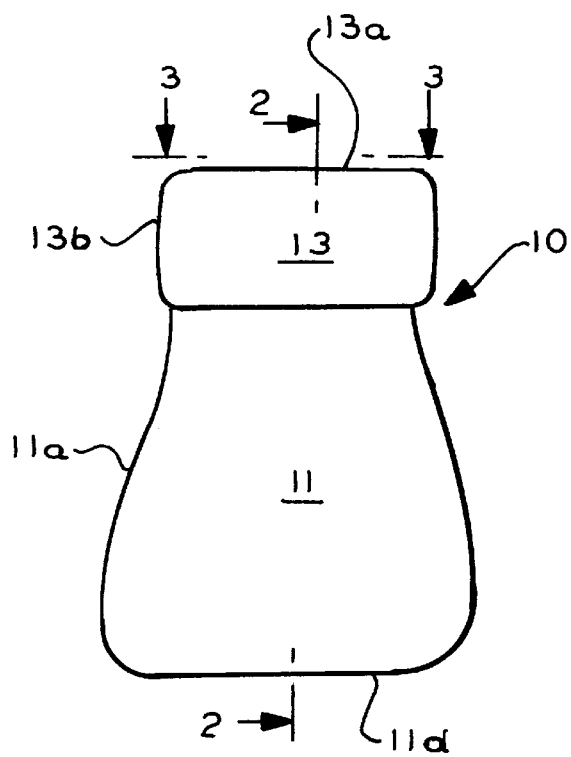
FIG. 1 is an elevation view of one embodiment of the planter pouch of the invention.
Figure 2:
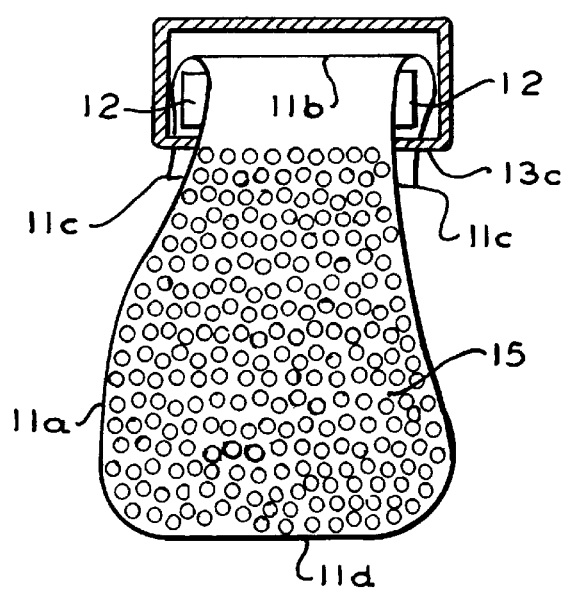
FIG. 2 is an exaggerated sectional view taken substantially on the line 2—2 of FIG. 1.
Figure 3:
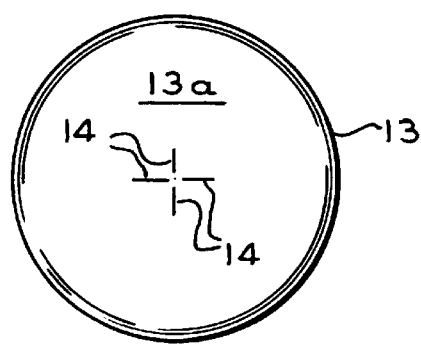
FIG. 3 is a top view taken substantially on the line 3—3 of FIG. 1.

Turning now to the drawing wherein like reference numerals denote like parts, it can be seen from FIGS. 1–3 that the planter pouch of the invention, generally identified by reference numeral 10, comprises a generally bag shaped, flexible, plastic bladder 11 having a wall 11a, an open top 11b and a bottom 11d, the end of the open top 11b being indicated by 11c.

Adjacent the open top 11b of bladder 11 there is positioned a rigid, circular, plastic collar 12. The open top 11b of bladder 11 is pulled through the collar 12 an amount sufficient for the end 11c of bladder 11 to be draped over the outer surface of collar 12 toward the bladder wall 11a. The bladder 11 can be secured to the inside and outside diameters of collar 12 using conventional water proof tapes and glues.

A cylindrical vinyl cap 13 having a top 13a, a circumferential wall 13b and an open bottom 13c is placed over the collar 12 so that the draped bladder end 11c is contained between the inner surface of circumferential wall 13b of vinyl cap 13 and the outer circumferential surface of the collar 12 in a close fitting relationship. Prior to securing these components together, the body of bladder 11 is filled with a polymeric growth medium as indicated by reference numeral 15.

Figure 4:
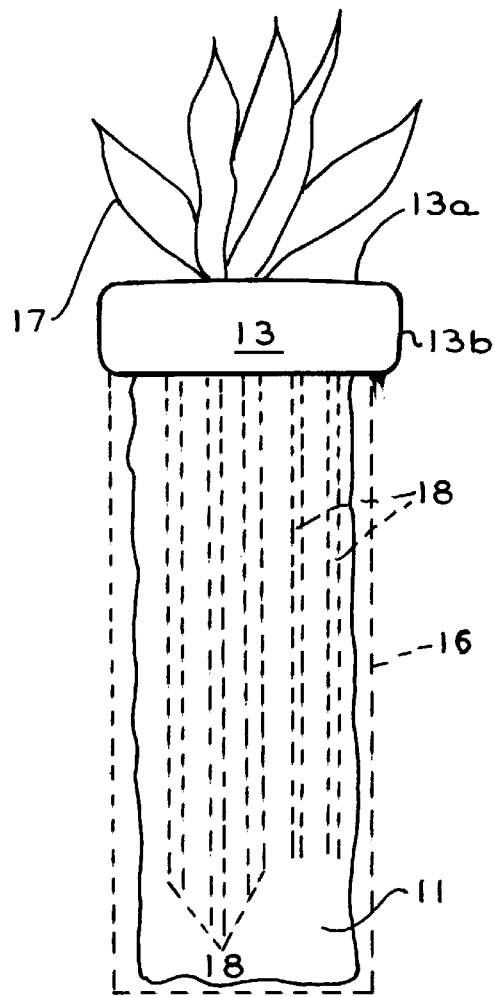
FIG. 4 is an elevation view of another embodiment of the planter pouch of the invention, part shown in phantom for clarity.

In order to insert living plant stalks into the body of bladder 11 and embed them in the polymeric growth medium 15, a plurality of slits 14 are formed in the top 13a of cap 13 as shown in FIG. 3. These slits permit the living plant stalks to be readily inserted and readily permit the stalks of the growing plants to push through them while maintaining a virtually air tight and moisture tight seal for the polymer growth medium 15. As illustrated in FIG. 4, bladder 11 can also be placed within a suitable vessel such as a rigid, cylindrical container 16 whereupon the bladder will assume the shape and configuration of the container. FIG. 4 also illustrates living plants 17 growing out of container 16 through the slits 14 in the top 13a of cap 13 (FIG. 3) as well as the stalks 18 of the living plants 17 extending downward into the polymeric growth medium (not shown) in the bladder 11 within the container 16.

In the embodiment of the invention illustrated in FIGS. 1–3, the overall height of the planter pouch 10 is about 5" and its diameter at the bottom 11d of bladder 11 is about 4". The wall thickness of the flexible plastic bladder is about 2.0 mills; the diameter of the rigid plastic collar 12 can be from about 1" to about 3", its height can be from about ½" to about 2" and its wall thickness can be about 0.25"; and, the dimensions of the cylindrical cap 13 will be only slightly larger than those of the collar 12 to provide a close fitting relationship between them. For larger or smaller planter pouches, the sizes and dimensions of these components can obviously be increased or decreased as desired.

To make the planter pouch 10 of the invention more aesthetically appealing, the bladder 11 can wrapped with a decorative fabric and the outer surface of the container (FIG. 4) can be painted, stained or printed with a colorful design.

The planter pouch of the invention reduces the need to add water to the living plants contained therein for prolonged periods of time, up to several weeks or even months; minimizes the invasion of foreign substances including disease, microscopic organisms, airborne dust and dirt, and the like, which would have an adverse affect on the living plants; can be transported without difficulty; permits the living plants to be transplanted without damage to the plant stalks or their root structures; permits additional live plant stalks to be inserted into the planter; and, provides an environment for the healthy co-habitation of various plant species within the planter since different watering requirements of various plant species will automatically be furnished.

Although the planter pouch of the invention has been described with particularity and in some detail, it will be appreciated by those skilled in the art that changes and modifications can be made therein without departing from the scope and spirit of the invention.

what is claimed:

1. A planter pouch comprising:
   (a) a flexible, plastic bladder having an open top;
   (b) a rigid, circular collar;
   (c) a cylindrical cap having a top and an open bottom;
   (d) a polymeric growth medium in said bladder in an amount sufficient to receive the roots of a living plant therein; and, (e) means to insert the stalk of a living plant through the top of said cap and embed the roots of said stalk into said polymeric growth medium, the open top of said bladder, said circular collar and said cap being secured to one another.

2. The planter pouch of claim 1 wherein said plastic bladder is provided from the group of plastics consisting of low density polyethylenes.

3. The planter pouch of claim 1 wherein said collar is provided from a polyeth terephthalate glycol copolyester.

4. The planter pouch of claim 1 wherein said cap is a stretchable polyvinylchloride.

5. The planter pouch of claim 1 wherein said polymeric growth medium is a hydrophilic polymer selected from the group consisting of cross-linked acrylamide/acrylic acid copolymers, cross-linked acrylamide potassium acrylate copolymers, and polyacrylamides.

6. The planter pouch of claim 1 wherein the open top of said bladder, said circular collar and said cylindrical cap are secured to one another with water proof tapes or glues.

7. The planter pouch of claim 1 wherein said insertion means comprises a plurality of slits formed in the top of said cylindrical cap.

8. The planter pouch of claim 1 wherein said polymeric growth medium includes non-hydrophilic polymer crystals in an amount of from about 1% about 2% by weight of said polymeric growth medium, said non-hydrophilic polymer crystals being selected from the group consisting of cross-linked acrylamide/acrylic acid copolymers, cross-linked acrylamide potassium acrylate copolymers, and polyacrylamides.

9. A planter pouch comprising:

(a) a flexible, plastic bladder having an open top which is provided from the group of plastics consisting of low density polyethylenes;

(b) a rigid, plastic circular collar wherein said plastic is provided from a polyeth terephthalate glycol copolyester;

(c) a cylindrical, vinyl cap having a top, an open bottom and a plurality of slits formed in said top, said vinyl being a stretchable polyvinylchloride;

(d) a hydrophilic polymeric growth medium in said bladder in an amount sufficient to receive the roots of a living plant therein, said hydrophilic polymeric growth medium being a member selected from the group consisting of cross-linked acrylamide/acrylic acid copolymers, cross-linked acrylamide potassium acrylate copolymers, and polyacrylamides;

(e) a water proof adhesive to secure the open top of said bladder, said circular collar and said cylindrical cap to owe another, such that the stalk of a living plant can be inserted through the slits in the top of said cap and the roots of said living plant embedded into said polymeric growth medium.

10. The planter pouch of claim 9 wherein said polymeric growth medium includes non-hydrophilic polymer crystals in an amount of from about 1% to about 2% by weight of said polymeric growth medium, said non-hydrophilic polymer crystals being selected from the group consisting of cross-linked acrylamide/acrylic acid copolymers, cross-linked acrylamide potassium acrylate copolymers, and polyacrylamides.

* * * * *